United States Patent
Mutsuda et al.

(10) Patent No.: US 11,142,613 B2
(45) Date of Patent: Oct. 12, 2021

(54) POLYAMIDE PARTICLES, PRODUCTION PROCESS THEREFOR, RESIN COMPOSITION, AND MOLDED ARTICLE

(71) Applicant: DAICEL-EVONIK LTD., Tokyo (JP)

(72) Inventors: Mitsuteru Mutsuda, Himeji (JP); Yoshiki Nakaie, Himeji (JP); Takayuki Uno, Himeji (JP)

(73) Assignee: DAICEL-EVONIK LTD., Tokyo (JP)

( * ) Notice: Subject to any disclaimer, the term of this patent is extended or adjusted under 35 U.S.C. 154(b) by 0 days.

(21) Appl. No.: 16/313,286

(22) PCT Filed: Apr. 10, 2017

(86) PCT No.: PCT/JP2017/014636
§ 371 (c)(1),
(2) Date: Dec. 26, 2018

(87) PCT Pub. No.: WO2018/016138
PCT Pub. Date: Jan. 25, 2018

(65) Prior Publication Data
US 2019/0161587 A1    May 30, 2019

(30) Foreign Application Priority Data
Jul. 19, 2016   (JP) .............................. JP2016-141825

(51) Int. Cl.
| | |
|---|---|
| C08J 3/12 | (2006.01) |
| C08K 7/14 | (2006.01) |
| C08L 63/00 | (2006.01) |
| C08L 77/00 | (2006.01) |
| C08G 69/08 | (2006.01) |
| C08G 69/26 | (2006.01) |
| C08K 7/04 | (2006.01) |
| C08G 69/14 | (2006.01) |
| C08J 3/00 | (2006.01) |
| C08K 7/06 | (2006.01) |

(52) U.S. Cl.
CPC ............... *C08J 3/12* (2013.01); *C08G 69/08* (2013.01); *C08G 69/14* (2013.01); *C08G 69/26* (2013.01); *C08J 3/005* (2013.01); *C08K 7/04* (2013.01); *C08K 7/06* (2013.01); *C08K 7/14* (2013.01); *C08L 63/00* (2013.01); *C08L 77/00* (2013.01); *C08J 2377/06* (2013.01)

(58) Field of Classification Search
CPC .. C08L 77/06; C08L 77/02; C08J 3/12; C08G 69/02; C08G 69/14; C08G 69/26
See application file for complete search history.

(56) References Cited

U.S. PATENT DOCUMENTS

| | | | |
|---|---|---|---|
| 9,068,078 B2 | 6/2015 | Isago et al. | |
| 9,676,936 B2 | 6/2017 | Shimizu et al. | |
| 2009/0310067 A1* | 12/2009 | Shoji | G02B 5/3008 349/96 |
| 2011/0021409 A1* | 1/2011 | Cox | C11D 3/505 510/349 |
| 2011/0244007 A1 | 10/2011 | Matsui et al. | |
| 2012/0315483 A1* | 12/2012 | Baumann | C08L 77/06 428/402 |
| 2014/0162518 A1* | 6/2014 | Shimizu | B32B 5/145 442/175 |
| 2014/0256864 A1 | 9/2014 | Isago et al. | |
| 2015/0344686 A1 | 12/2015 | Shimizu et al. | |
| 2016/0083541 A1 | 3/2016 | Fukuda et al. | |
| 2016/0102187 A1* | 4/2016 | Leventis | C07C 69/618 521/153 |
| 2016/0200910 A1 | 7/2016 | Mutsuda et al. | |
| 2016/0280872 A1 | 9/2016 | Minami et al. | |
| 2016/0289405 A1 | 10/2016 | Minami et al. | |
| 2016/0297942 A1 | 10/2016 | Minami et al. | |
| 2018/0258240 A1 | 9/2018 | Mutsuda et al. | |

FOREIGN PATENT DOCUMENTS

| | | |
|---|---|---|
| CN | 103717653 A | 4/2014 |
| JP | 2006-257117 A | 9/2006 |
| JP | 2008-86874 A | 4/2008 |
| JP | 2010-132811 A | 6/2010 |

(Continued)

OTHER PUBLICATIONS

Griehl et al "Nylon-12 Preparation, Properties, and Applications", Industrial and Engineering Chemistry, vol. 62, N3, pp. 16-22, Mar. 1970.*
International Search Report (PCT/ISA/210) issued in PCT/JP2017/014636, dated Jul. 11, 2017.
Written Opinion (PCT/ISA/237) issued in PCT/JP2017/014636, dated Jul. 11, 2017.

(Continued)

*Primary Examiner* — Gregory Listvoyb
(74) *Attorney, Agent, or Firm* — Birch, Stewart, Kolash & Birch, LLP

(57) ABSTRACT

Polyamide particles including polyamide and having a water absorption rate of 0.5 to 2.5 wt. % are prepared to improve toughness of a cured product of a curable resin. The polyamide may be a semicrystalline polyamide. The polyamide has a glass transition temperature of approximately 100 to 150° C. The polyamide may have an alicyclic structure. The polyamide particles of this invention have an average particle size of approximately 5 to 40 μm and a specific surface area determined by the BET method of approximately 0.08 to 12 m²/g. The polyamide particles of the present invention may also be spherical and have an average particle size of approximately 15 to 25 μm. Furthermore, the polyamide particles of the present invention may have an exothermic peak in a temperature range between the glass transition temperature and a melting point of the polyamide upon heating the polyamide particles at a rate of 10° C./min by differential scanning calorimetry (DSC).

10 Claims, No Drawings

(56) References Cited

FOREIGN PATENT DOCUMENTS

| JP | 2014-145003 A | 8/2014 |
| JP | 5655976 B1 | 1/2015 |
| JP | 2015-098532 A | 5/2015 |
| WO | WO 2013/046682 A1 | 4/2013 |
| WO | WO 2015/033998 A1 | 3/2015 |
| WO | WO 2015/076069 A1 | 5/2015 |
| WO | WO 2015/076070 A1 | 5/2015 |
| WO | WO 2015/076074 A1 | 5/2015 |
| WO | WO 2017/061502 A1 | 4/2017 |

OTHER PUBLICATIONS

Extended European Search Report dated Jun. 19, 2019, in European Patent Application No. 17830658.5.

Vestosint Vestosint et al.: "VESTOSINT=registered trademark of the Evonik Degussa GmbH Product Information Product Information Product Information Product Information in the department Market Development the department Market Development the department Market Development the department Market Development of the High Perform", Jun. 1, 2008 (Jun. 1, 2008), XP055594528.

English translation of International Preliminary Report on Patentability and Written Opinion dated Jan. 31, 2019, in PCT/JP2017/014636 (Forms PCT/IB/338, PCT/IB/373, and PCT/ISA/237).

Trogamide, Daicel Olviroco Co., Feb. 2000, pp. 1-10 (13 pages total), Retrieved from the internet: https://www.daicel-evonik.com/assets/img/uploads/TROGAMID(LightWeight)_1.pdf [retreived on Jan. 26, 2021].

Vestosint, Degussa AG, Dec. 2004, pp. 1-15 (17 pages total), Retreived from the internet: http://www.todo1104.sakura.ne.jp/takagi/test/daicel_en/catalog/nylon12_p/pdf/vestosint_eng.pdf [retreived on Jan. 26, 2021].

Japanese Office Action for Japanese Application No. 2018-528403, dated Jan. 26, 2021, with English translation.

"VESTOSINT® 2070 natural color," Evonik industries, Jun. 2008, 11 pages total.

Chinese Office Action and Search Report for Chinese Application No. 201780045060.7, dated Apr. 29, 2021, with an English translation.

* cited by examiner

POLYAMIDE PARTICLES, PRODUCTION PROCESS THEREFOR, RESIN COMPOSITION, AND MOLDED ARTICLE

TECHNICAL FIELD

The present invention relates to polyamide particles for improving toughness of cured products of curable resin compositions such as fiber-reinforced composite materials and a production process for the polyamide particles as well as a curable resin composition including the particles and a molded article formed of this composition.

BACKGROUND ART

Carbon fiber-reinforced composite materials (CFRP) including carbon fibers and a matrix resin are excellent in strength, stiffness, and the like, and used in various applications (for example, primary structural members of airplanes, members for automobiles, windmill blades, housings of various electronic devices, and the like). Particularly important physical properties in such applications primarily include physical strength, for example, impact strength, elastic modulus, flexural strength, and the like. To improve such physical properties, schemes such as further addition of various fillers to CFRPs including a matrix resin (for example, an epoxy resin component) and carbon fibers have been devised. Among them, various studies have been made on reinforcement of CFRPs with polyamide particles recently.

JP 2014-145003 A (Patent Document 1) discloses a prepreg (an intermediate material for molding) including reinforcing fibers, an epoxy resin, and two types of polymer particles having different average particle sizes, wherein, of the polymer particles, polymer particles with a larger particle size, which have an average particle size of 10 to 30 µm, have a glass transition temperature of 80 to 180° C. In examples of this document, polyamide particles are prepared by a chemical milling technique, wherein a polyamide is dissolved in a solvent, and then a poor solvent is dropped to precipitate the particles.

JP 5655976 B (Patent Document 2) discloses a prepreg including reinforcing fibers, a thermosetting resin, and a composition including a crystalline polyamide and a noncrystalline polyamide; and further including particles having a specific storage elastic modulus and a glass transition temperature of 80 to 180° C. Also in examples of this document, polyamide particles are prepared by a chemical milling technique, wherein a crystalline polyamide and a noncrystalline polyamide are dissolved in a solvent, and then a poor solvent is dropped to precipitate the particles.

WO 2015/033998 pamphlet (Patent Document 3) discloses, as a composition for composite material for fiber reinforcement that can be used as a prepreg, a composition including reinforcing fibers, spherical polyamide resin particles having an average particle size of 12 to 70 µm, and a matrix resin. In examples of this document, polyamide resin particles are prepared by a forced emulsification method, wherein a material incompatible with the polyamide is used to melt-knead the polyamide.

JP 2015-98532 A (Patent Document 4) discloses a prepreg including a reinforcing fiber layer including reinforcing fibers and a resin composition impregnated between fibers of the reinforcing fibers; and a surface layer provided on at least one surface of the reinforcing fiber layer, wherein the surface layer contains a benzoxazine resin, an epoxy resin, a curing agent having two or more phenolic hydroxyl groups in a molecule, and polyamide resin particles having an average particle size of 5 to 50 µm and including polyamide 12 resin particles and polyamide 1010 resin particles.

In these polyamide particles, however, a reinforcing effect of the reinforcing fibers was not sufficient, and also toughness of a cured product of the curable resin composition was low. Furthermore, in the polyamide particles of Patent Documents 1 and 2, two types of polyamide particles were used, and thus they needed to be uniformly mixed, resulting in poor handleability.

CITATION LIST

Patent Literature

Patent Document 1: JP 2014-145003 A (claim 1, examples)
Patent Document 2: JP 5655976 B (Claims, examples)
Patent Document 3: WO 2015/033998 Pamphlet (Claims, examples)
Patent Document 4: JP 2015-98532 A (claim 1)

SUMMARY OF INVENTION

Technical Problem

It is therefore an object of the present invention to provide polyamide particles that can provide improved toughness of cured products of curable resins and a process for producing the polyamide particles as well as a curable resin composition including the particles and a molded article formed of this composition.

It is another object of the present invention to provide polyamide particles that can provide an improved reinforcing effect by reinforcing fibers (particularly carbon fibers) in fiber-reinforced composite materials (FRP) and a process for producing the polyamide particles as well as a curable resin composition including the particles and a molded article formed of this composition.

It is still another object of the present invention to provide polyamide particles that are excellent in handleability and can easily improve interlaminar toughness of FRPs and a process for producing the polyamide particles as well as a curable resin composition including the particles and a molded article formed of this composition.

Solution to Problem

To achieve the objectives, the present inventors paid attention to water absorption rate of polyamide particles. Polyamides are known as resins having high water absorbency. However, in the field of structural materials, water absorbency may lower dimensional stability and electrical properties. Therefore, those skilled in the art may typically use a polyamide having reduced water absorption rate as low as possible. Patent Documents 1 to 4 do not describe water absorption rate of polyamide particles. For example, Patent Documents 1 and 2 investigated the glass transition temperature of the polyamide and the temperature dependence of storage elastic modulus G', and these properties are properties of the polyamide constituting the particles, and not even properties of the polyamide particles. Patent Documents 3 and 4 only specify particle size and chemical structures of the polyamide particles. In addition, Patent Documents 3 and 4 do not describe drying conditions for resulting polyamide particles, and therefore it is impossible to even estimate the water absorption rate. For example, in Patent Document 3, solvents such as polyethylene glycol are eluted to prepare polyamide particles, but a method for removing the solvents (drying conditions) is not described. However, in drying to remove a solvent from polyamide particles, those skilled in the art typically heat the polyamide particles at the highest possible temperature, i.e., a temperature equal to or higher than the glass transition temperature of the polyamide to reduce water absorption rate as previously described as well as to improve production efficiency. In particular, in the field of FRP using curable resins such as an epoxy resin, it has been a common technical knowledge to avoid inclusion of moisture as much as possible as the moisture may cause curing failure of the epoxy resin. In addition, to avoid water absorption after heating and drying, polyamide particles are packed with a packaging material such as aluminum, which is impermeable to water, and stored in a state where transport of moisture is restricted. Therefore, in polyamide particles, an amount of water absorption at the time of drying is maintained as long as the bag is not opened. In contrast, the present inventors unexpectedly found that adjusting water absorption rate of polyamide particles in a predetermined range can improve toughness of a cured product of a curable resin composition. That is, Patent Documents 1 to 4 disclose no technical concept to control properties of polyamide particles themselves, and the present inventors found that resulting polyamide particles fail to improve the toughness of a cured product of a curable resin because of the low water absorption rate, and fail to improve a reinforcing effect by fibers in a composition including reinforcing fibers.

In addition, known as representative processes for producing resin particles are: (1) a freeze milling method (for example, a method of cooling and embrittling a resin with liquid nitrogen and then milling or crushing the resin by physical force to form powder, and the like), (2) a chemical milling method (for example, a method of dissolving a resin in a solvent and then dropping the solution to a poor solvent to precipitate particles, and the like), (3) a polymerization method (for example, a method of polymerizing while forming particles by suspension polymerization, emulsion polymerization, or the like), (4) a forced emulsification method (for example, a method of melt-kneading a material incompatible with a resin (including water-soluble materials, such as water-soluble polymers (polyethylene glycol and the like), saccharides (polysaccharides, oligosaccharide, and the like)), and a resin to produce a dispersion where resin particles are dispersed in the incompatible material (water-soluble polymer), and then removing the incompatible material from the dispersion, and the like), (5) a laser method (a method of melting a resin instantaneously with laser and blowing off the resultant fibrous resin in the air, employing a reduced pressure tank and the like in combination, to produce resin particles), and the like. For the polyamide particles having a specific water absorption rate, the present inventors selected the forced emulsification method among these methods, and discovered that regulating thermal history (particularly drying conditions) within special conditions imparts the polyamide particles with appropriate crystallinity (semicrystallinity) to exhibit such a specific water absorption rate.

That is, polyamide particles of the present invention include polyamide and have a water absorption rate of 0.5 to 2.5 wt. %. The polyamide may be a semicrystalline polyamide. The polyamide has a glass transition temperature approximately from 100 to 150° C. The polyamide may be an alicyclic polyamide and/or an aliphatic polyamide. The polyamide particles of the present invention have an average particle size of approximately 5 to 40 µm and a specific surface area determined by the BET method of approximately 0.08 to 12 m$^2$/g. The polyamide particles of the present invention may also be spherical and have an average particle size of approximately 15 to 25 µm. In addition, the polyamide particles of the present invention may have an exothermic peak in a temperature range between the glass transition temperature and a melting point of the polyamide upon heating the polyamide particles at a rate of 10° C./min by differential scanning calorimetry (DSC).

The present invention also includes a process for producing the polyamide particles, the method including: melt-kneading a polyamide and an aqueous medium incompatible with the polyamide; removing the aqueous medium from the resulting melt-kneaded product with a hydrophilic solvent to produce precursor particles; and controlling temperature and humidity to adjust the water absorption amount of the resulting precursor particles.

The present invention also includes a curable resin composition including the polyamide particles and a curable resin. The curable resin may include an epoxy resin. The ratio of the polyamide particles may be not greater than 30 wt. % with respect to the total amount of the polyamide particles and the curable resin. The curable resin composition of the present invention may further include reinforcing fibers. The reinforcing fibers may include carbon fibers and/or glass fibers.

In addition, the present invention includes a molded article including a cured product of the curable resin composition.

In the present specification and claims, in a case where the curable resin composition includes a curing agent and/or a curing accelerator in addition to the curable resin, "curable resin" is used in a meaning a curable resin including a curing agent and/or a curing accelerator.

Advantageous Effects of Invention

In the present invention, the water absorption rate of the polyamide particles is adjusted to 0.5 to 2.5 wt. %, and thus the toughness of the cured product of the curable resin can be improved. In particular, adjusting the glass transition temperature of the polyamide constituting the polyamide particles to 100 to 150° C. can improve toughness of a cured product of the epoxy resin. In addition, such an adjustment can improve a reinforcing effect by reinforcing fibers (particularly carbon fibers). Furthermore, simply impregnating the reinforcing fibers with the polyamide particles having adjusted water absorption rate in combination with the curable resin can easily improve the interlaminar toughness of FRP. Thus, the polyamide particles are also excellent in handleability.

Compounding the polyamide particles of the present invention in a curable resin (particularly a curable resin and reinforcing fibers) improves the toughness of a cured product and the reinforcing effect of the reinforcing fibers in spite of the fact that the particles are in a state of fine particles and in a small compounded ratio. The mechanism thereof is not clear, but it can be estimated that this is because having a predetermined water absorption rate improve flexibility of the polyamide particles, and thus deformation of the polyamide particles in the composition may help absorb fracture energy as well as facilitate intimate contact with the cured product of the curable resin and the reinforcing fibers thereby inhibiting formation of gaps. Further, it is estimated that when the polyamide particles of the present invention have a predetermined crystallinity, adjustment of water absorption rate becomes easy, and compatibility with the curable resin (particularly the epoxy resin) is also improved, and an alloy layer is formed in the border with the curable resin, thereby further improving toughness of the cured product.

DESCRIPTION OF EMBODIMENTS

[Polyamide Particles]

The polyamide particles of the present invention include a polyamide having an amide bond in the main chain, may be formed of a polyamide alone, or may be formed of a resin composition including a polyamide (a resin composition including a polyamide as a main component). The ratio of the polyamide may be, for example, not less than 60 wt. %, preferably not less than 80 wt. %, and still more preferably not less than 90 wt. % with respect to the whole particles.

Examples of the polyamides include aliphatic polyamides, alicyclic polyamides, and aromatic polyamides. The polyamide may be a homopolyamide or a copolyamide. An end group of the polyamide is not particularly limited, and it may be an amino group, a carboxyl group, or an anhydride group.

Among aliphatic polyamides, examples of the homopolyamides include: homo or copolyamides of an aliphatic diamine component (an alkandiamine, for example, a $C_{4-16}$ alkylenediamine, preferably a $C_{6-14}$ alkylenediamine, and still more preferably a $C_{6-12}$ alkylenediamine, such as tetramethylenediamine, hexamethylenediamine, and dodecanediamine and the like) and an aliphatic dicarboxylic acid component (for example, an alkanedicarboxylic acid (for example, a $C_{4-20}$ alkanedicaroboxylic acid, preferably a $C_{5-18}$ alkanedicaroboxylic acid, and still more preferably a $C_{6-16}$ alkanedicaroboxylic acid, such as adipic acid, sebacic acid, and dodecanedioic acid) and the like); homo or copolyamides of a lactam (a lactam having about 4 to 20 carbons, preferably having from 4 to 16 carbons such as ε-caprolactam and ω-laurolactam) or an aminocarboxylic acid (for example, a $C_{4-20}$ aminocarboxylic acid, preferably a $C_{4-16}$ aminocarboxylic acid, and still more preferably a $C_{6-14}$ aminocarboxylic acid, and the like, such as ω-aminoundecanoic acid); copolyamides of a first amide formation component of the aliphatic diamine component and the aliphatic dicarboxylic acid component, and a second amide formation component of the lactam or the aminocarboxylic acid.

Examples of the specific aliphatic polyamides include polyamide 6, polyamide 11, polyamide 12, polyamide 46, polyamide 66, polyamide 610, polyamide 611, polyamide 612, polyamide 613, polyamide 1010, polyamide 1012, polyamide 66/11, polyamide 66/12, and polyamide 6/12/612.

Examples of the alicyclic polyamides include homopolyamides or copolyamides including as a component at least one type selected from alicyclic diamine components and alicyclic dicarboxylic acid components. For example, of diamine components and dicarboxylic acid components, an alicyclic polyamide and the like that can be produced using an alicyclic diamine and/or an alicyclic dicarboxylic acid as at least a part of components can be used. In particular, as the diamine component and the dicarboxylic acid component, along with the alicyclic diamine component and/or the alicyclic dicarboxylic acid component, the aliphatic diamine component and/or the aliphatic dicarboxylic acid component exemplified above are preferably used in combination. Such alicyclic polyamides are highly transparent and known as the so-called transparent polyamides.

Examples of the alicyclic diamine components include: diaminocycloalkanes (diamino $C_{5-10}$ cycloalkanes and the like) such as diaminocyclohexane; bis(aminocycloalkyl)alkanes [bis(amino $C_{5-8}$ cycloalkyl) $C_{1-3}$ alkanes and the like] such as bis(4-aminocyclohexyl)methane, bis(4-amino-3-methylcyclohexyl)methane, and 2,2-bis(4'-aminocyclohexyl)propane; and hydrogenated xylylenediamine. Alicyclic diamine components may have a substituent such as an alkyl group ($C_{1-6}$ alkyl groups, preferably $C_{1-4}$ alkyl groups, and still more preferably $C_{1-2}$ alkyl groups, such as a methyl group and an ethyl group). In addition, examples of the alicyclic dicarboxylic acids include cycloalkanedicarboxylic acids ($C_{5-10}$ cycloalkane-dicarboxylic acid and the like) such as 1,4-cyclohexanedicarboxylic acid, 1,3-cyclohexanedicarboxylic acid, and the like.

Examples of representative alicyclic polyamides include condensation products of alicyclic diamine components [for example, bis(aminocyclohexyl)alkanes and the like] and aliphatic dicarboxylic acid components [for example, alkanedicarboxylic acids (for example, $C_{4-20}$ alkane-dicarboxylic acid components and the like) and the like].

Aromatic polyamides include polyamides where at least one component of the aliphatic diamine component and the aliphatic dicarboxylic acid component in the aliphatic polyamide is an aromatic component. Examples of such polyamides include a polyamide where the diamine component is an aromatic component [for example, a condensation product of an aromatic diamine (methaxylylenediamine and the like) and an aliphatic dicarboxylic acid (for example, MXD-6 and the like), and the like], a polyamide where the dicarboxylic acid component is an aromatic component [for example, a condensation product of an aliphatic diamine (trimethylhexamethylenediamine and the like) and an aromatic dicarboxylic acid (terephthalic acid, isophthalic acid, and the like), and the like], and the like. In addition, the aromatic polyamide resin may be a wholly aromatic polyamide (aramid), a polyamide where the diamine component and the dicarboxylic acid component are aromatic components [poly(m-phenyleneisophthalamide) and the like].

These polyamides may be used alone or in combination of two or more. Among them, semicrystalline polyamides (polyamides having crystallinity) of alicyclic polyamides and aliphatic polyamides (alicyclic polyamides and/or aliphatic polyamides) are preferred for a large reinforcing effect of the curable resin, and alicyclic polyamides (polyamides having an alicyclic structure) are particularly preferred for the ease of polyamide particle localization in proximity to reinforcing fibers. In particular, for a resin constituting the polyamide particles, a noncrystalline resin is of course lower in the degree of crystallinity than a semicrystalline resin when formed into particles. In a case where the curable resin is an epoxy resin, a resin that is noncrystalline and can maintain its shape in curing conditions of the epoxy resin has a very high glass transition temperature and becomes brittle in a temperature range from room temperature to approximately 100° C. Thus, a reinforcing effect may deteriorate in a noncrystalline resin.

The number average molecular weight of the polyamide (particularly, the alicyclic polyamide) may be, for example, approximately from 8000 to 200000, preferably from 9000 to 150000, and still more preferably from 10000 to 100000. The number average molecular weight can be measured by gel permeation chromatography and the like using polystyrenes and the like as reference standards.

The melting point of the polyamide (particularly, the alicyclic polyamide) is not particularly limited, and a polyamide having a relatively high melting point may be suitably used. Such a polyamide can easily maintain a higher degree of sphericity during producing of a composition and a molded article, and therefore can efficiently provide a reinforcing effect of reinforcing fibers even when reinforcing fibers are included. The melting point of such a polyamide resin (the aliphatic polyamide, the alicyclic polyamide, and the like) may be, for example, not lower than 150° C. (for example, 155 to 350° C.), preferably not lower than 160° C. (for example, 165 to 300° C.), and still more preferably not lower than 170° C. (for example, 175 to 270° C.). In addition, the melting point (or a softening point) of the polyamide may be not lower than, or higher than the molding temperature of the composition [for example, a curing temperature of the curable resin (for example, an epoxy resin) as a matrix resin and the like].

The glass transition temperature (Tg) of the polyamide can be selected from a range of, for example, not lower than 30° C. (for example, about 50 to 200° C.). In a case where the curable resin includes an epoxy resin, it is preferably approximately from 100 to 150° C. and still more preferably from 110 to 145° C. (particularly from 120 to 140° C.). In a case where the glass transition temperature is less than 100° C., the polyamide particles may deform or aggregate because the curing reaction temperature of the epoxy resin used as the matrix resin is generally about 100 to 200° C. In contrast, in a case where the glass transition temperature exceeds 150° C., it can be difficult to produce polyamide particles with a preferable particle size and surface area, and thus the particles may become brittle at a low temperature.

A polyamide with a glass transition temperature of not lower than 100° C. belongs to a class of polyamides with a high glass transition temperature. And it is virtually impossible for aliphatic polyamides, due to its chemical structure, to have such a high glass transition temperature in general. Aromatic polyamides having a benzene ring in the main chain and alicyclic polyamides having an alicyclic structure in the main chain correspond to such polyamides. Alicyclic polyamides are preferred and semicrystalline alicyclic polyamides are particularly preferred in that they are excellent in toughness, particularly in a reinforcing effect on curable resins (particularly, epoxy resins) and composites of a curable resin and semicrystalline resin fibers such as reinforcing resins, and the like.

The degree of crystallinity of the polyamide (particularly, a semicrystalline polyamide) can be selected depending on the type of polyamide, and it may be not greater than 80% (for example, from 75 to 1%) and preferably not greater than 50% (for example, from 50 to 10%). In a case where the semicrystalline polyamide is an alicyclic polyamide, the degree of crystallinity is not greater than 40%, for example, approximately from 30 to 1%, preferably from 20 to 1%, and still more preferably from 20 to 5%. The degree of crystallinity of semicrystalline aliphatic polyamides having a $C_{6-10}$ alkane unit, such as polyamide 1010, may be not greater than 50%, for example, approximately from 50 to 1%, preferably from 45 to 10%, and still more preferably from 43 to 30%. The degree of crystallinity of semicrystalline aliphatic polyamides having a $C_{11-13}$ alkane unit, such as polyamide 12, may be not greater than 80%, for example, approximately from 80 to 10%, preferably from 78 to 30%, and still more preferably from 75 to 35%. When the degree of crystallinity is too high, reinforcing effects on curable resins (particularly, epoxy resins) and composites of a curable resin and reinforcing fibers cannot be possibly improved. In the present invention, the degree of crystallinity can be measured by a commonly used method, for example, an x-ray diffraction method and differential scanning calorimetry (DSC), and particularly, it can be measured based on wide angle x-ray diffraction (WAXD) described later in examples.

The polyamide particles preferably have an exothermic peak in a temperature range between the glass transition temperature and the melting point of the polyamide upon heating the polyamide particles at a rate of 10° C./min by differential scanning calorimetry (DSC). The exothermic peak only needs to be in the temperature range, for example, it may be at a temperature 1 to 70° C. higher than the glass transition temperature, and it may be at a temperature preferably approximately from 1 to 60° C. higher and still more preferably from 1 to 50° C. (particularly from 1 to 40° C.) higher. In the present invention, the polyamide particles having such thermal properties (crystal structures) tend to act with the curable resin (particularly the epoxy resin). This can improve the toughness of the cured product, and also improve the reinforcing effect of the reinforcing fibers.

In the process of producing a CFRP, particles added are exposed to a temperature environment exceeding 150° C. over a long time for a curing reaction of an epoxy resin, and in addition, the particles are subjected to chemical effects of the epoxy resin and a curing agent under a curing reaction. However, the thermal properties of the polyamide particles themselves used for reinforcing the CFRP have been rarely investigated. In particular, for the polyamide constituting the particles, in the resin solidified by cooling after melting with heat, a higher order structure (such as degree of crystallinity) of the molecule after the solidification largely varies with the mode of thermal history (particularly heating by drying) after the solidification. Although such a difference in the higher order structure has a great effect on the reinforcing effect of the particles in the CFRP, known technologies have not been investigated for these points. In addition, as previously described, in ordinary drying conditions, crystallization proceeds by heating for drying. Thus, the degree of crystallinity of the present invention that is low enough to exhibit the exothermic peak of the crystallization in the process of the 1st Heat of differential scanning calorimetry (DSC) cannot be achieved.

In the present invention, the water absorption rate of the polyamide is adjusted to a specific rate, thereby improving the toughness of the cured product of the curable resin (particularly, the toughness of the cured product of the epoxy resin composition including reinforcing fibers). The water absorption rate of the polyamide particles is from 0.5 to 2.5 wt. %, for example, approximately from 0.5 to 2 wt. % (for example, from 0.8 to 1.5 wt. %), preferably from 0.55 to 2 wt. % (for example, from 0.6 to 1.5 wt. %), and still more preferably from 0.65 to 1 wt. % (particularly from 0.7 to 0.8 wt. %). In a case where the water absorption rate is less than 0.5 wt. %, the toughness-improving effect cannot be sufficiently exhibited. In contrast, in a case where the water absorption rate exceeds 2.5 wt. %, a sufficient toughness-improving effect cannot be obtained, and the curing reaction of the curable resin such as the epoxy resin may be affected, and voids may be formed in the particles during the curing reaction. In the present specification and claims, the water absorption rate of the polyamide particles can be measured by the Karl Fischer method, in particular, by a method described later in examples.

For the shape of polyamide particles, an indefinite shape, a potato shape, a spherical shape, and the like are known, and such a shape is in general often determined depending on the process for producing the particles. Among these shapes, a spherical shape is preferred. Examples of the spherical shapes include a true spherical shape or a shape similar to the true spherical shape, [for example, a shape with a smooth surface (or a surface free of unevenness) and with the dimensions in the major axis and in the minor axis being closely the same (for example, the ratio of the major axis dimension to the minor axis dimension is approximately from 1.3/1 to 1/1, preferably from 1.2/1 to 1/1, and still more preferably from 1.1/1 to 1/1)] and the like. Among them, a true spherical shape is preferred.

As representative processes for producing polyamide particles, known are: (1) a freeze milling method, (2) a chemical milling method, (3) a polymerization method, (4) a forced emulsification method, (5) a laser method, and the like. Among these methods, the forced emulsification method (4) can produce spherical particles with a relatively small specific surface area for the polyamide particles having a specific water absorption rate. The present inventors found that the degree of crystallinity could vary even in this method depending on the type of a polyamide to be used, a combination of a polyamide and a water-soluble medium, process temperature, a cooling method, a drying method after the water-soluble medium was removed. The degree of crystallinity, along with a subsequent thermal history and the like, has a great effect on the water absorption amount of the polyamide particles.

In the present invention, the specific surface area of the polyamide particles can be measured mainly by a BET method. Rather than the surface area of the particles (powder), the smaller area of pointed portions on the particles and the uniformity of the particle shape advantageously contribute to a stable reinforcing effect. Therefore, a spherical shape, which is a shape with a smaller specific surface area, is preferred, and a true spherical shape, which is a shape having the smallest specific surface area, is particularly preferred. The relationship between the particle size and the specific surface area for the particles that are completely spherical and has no distribution in the particle size is shown in Table 1.

TABLE 1

| | | Particle size of polyamide particles | | | | |
|---|---|---|---|---|---|---|
| | | 40 μm | 30 μm | 20 μm | 10 μm | 5 μm |
| Specific surface area (m²/g) | Resin specific gravity 1.0 | 0.075 | 0.100 | 0.150 | 0.300 | 0.600 |
| | Resin specific gravity 1.2 | 0.063 | 0.083 | 0.125 | 0.250 | 0.50 |

The specific gravity varies with the type of polyamide. For the aliphatic polyamide (polyamide 12) and the alicyclic polyamide, the specific gravities are generally approximately 1.0. For example, in a case where the average particle size of the polyamide particles is about 20 μm, for example, the specific surface area of the polyamide particles is approximately from 2 to 3.5 m²/g for the chemical milling method (2), and approximately from 0.2 to 0.4 m²/g for the forced emulsification method (4) described above. The preferred specific surface area for the polyamide particles is from 0.08 to 12 m²/g, and in more particular, suitable specific surface areas are from 0.08 to 1.5 m²/g for particles with an average particle size of approximately 40 μm, from 0.15 to 2 m²/g for particles with an average particle size of approximately 30 μm, from 0.2 to 3 m²/g for particles with an average particle size of approximately 20 μm, from 0.3 to 6 m²/g for particles with an average particle size of approximately 10 μm, and from 0.6 to 12 m²/g for particles with an average particle size of approximately 5 μm.

The average particle size of the polyamide particles can be selected from a range of not less than 3 μm (for example, from 5 to 40 μm). For example, the average particle size may be not less than 14 μm (for example, from 15 to 40 μm), preferably not less than 16 μm (for example, from 17 to 35 μm), still more preferably not less than 18 μm (for example, from 19 to 30 μm), particularly not less than 20 μm (for example, from 21 to 30 μm). Particularly for a fiber-reinforced composite material (particularly a material including an epoxy resin), the average particle size may be typically approximately from 12 to 40 μm, preferably from 15 to 30 μm, and still more preferably from 15 to 25 μm. In a case where the average particle size is too small, the reinforcing effect of reinforcing fibers cannot be improved when the reinforcing fibers are included. In the present specification and claims, the average particle size is expressed in terms of the number average primary particle size, and can be measured by a laser diffraction scattering method and the like.

The range is the range of the average particle size, and the polyamide particles having a particle size within the average particle size seem to mainly contribute to an efficient reinforcing effect. Therefore, the polyamide particles may include, for example, polyamide particles with a particle size in a range from 5 to 40 μm (particularly from 15 to 40 μm) in not less than 50% (for example, not less than 60%), preferably not less than 70%, still more preferably not less than 80%, and particularly not less than 90% with respect to the total in terms of the number of particles.

In addition, in a case where the polyamide particles are used together with reinforcing fibers, the average particle size of the polyamide particles can be selected depending on the average size of the reinforcing fibers. For example, it may be approximately from 0.5 to 15 times (for example, from 0.7 to 12 times), preferably from 1 to 10 times (for example, from 1.5 to 5 times), still more preferably from 1.8 to 7 times (particularly from 2 to 6 times) the average diameter (average fiber diameter) of the reinforcing fibers, and it may be usually approximately from 1.5 to 15 times (for example, from 2 to 10 times). Use of the polyamide particles with such particle sizes facilitates the localization of the polyamide particles in proximity to the reinforcing fibers and efficiently enhances the reinforcing effect by the reinforcing fibers.

The polyamide particles only need to include a polyamide resin, and may further include an impact modifier. Examples of the impact modifier include polyolefin resins modified with acid (acid-modified polyolefin resins), resins having an epoxy group-containing group such as a glycidyl group, and the like. These impact modifiers can be used alone or in combination of two or more. Among these impact modifiers, acid-modified polyolefin resins are preferred, and the acid-modified polyolefin resins may partially have carbon-carbon double bonds. The ratio of the impact modifier is, for example, approximately from 1 to 30 parts by weight, preferably from 1 to 25 parts by weight, and still more preferably from 5 to 20 parts by weight per 100 parts by weight of the polyamide.

The polyamide particles may further include another thermoplastic resin and a commonly used additive as other components. Examples of the commonly used additive include stabilizers, fillers (nonfibrous fillers), colorants, dispersants, antiseptics, antioxidants, defoamers, and the like. These other components may be used alone or in combination of two or more. The total ratio of the other components may be, for example, not greater than 10 parts by weight (for example, approximately from 0.01 to 10 parts by weight) per 100 parts by weight of the polyamide.

[Process for Producing Polyamide Particles]

The polyamide particles of the present invention can be produced through steps of: melt-kneading a polyamide and an aqueous medium incompatible with the polyamide; removing the aqueous medium from the resulting melt-kneaded product with a hydrophilic solvent to produce precursor particles; and controlling temperature and humidity to adjust the water absorption amount of the resulting precursor particles.

The steps of melt-kneading and removing the aqueous medium are similar to the steps in a commonly used forced emulsification method. In the present invention, particle formation by the forced emulsification method is followed by the adjustment of the water absorption rate of the polyamide particles in the step of adjusting moisture. As the forced emulsification method, a commonly used method, for example, the method described in JP 2010-132811 A can be utilized.

The aqueous medium can be selected depending on the type of polyamide, and examples thereof include hot-melt saccharides (oligosaccharides such as sucrose and maltotriose; sugar alcohols such as xylitol, erythritol, sorbitol, and mannitol; and the like); water-soluble polymers (water-soluble synthetic polymers such as polyethylene glycol, polyvinyl alcohol, sodium polyacrylate, and polyacrylamide; polysaccharides such as starch and methyl cellulose; and the like). These aqueous media can be used alone or in combination of two or more.

Among them, water-soluble polymers (for example, water-soluble synthetic polymers such as polyethylene glycol and polyvinyl alcohol) may be used. For example, polyethylene glycols such as "PEG-20000", "PEG-11000", "PEG-1000", and "PEG-200" available from NOF CORPORATION, and the like can be used alone or in combination of two or more. The viscosity of the aqueous medium is one of factors to control the particle size of the resin particles produced by the forced emulsification method. The choice of the viscosity depends on a targeted particle size, the type and molecular weight of the polyamide, the volume ratio of the polyamide to aqueous medium, shear rate (shearing speed) in compounding, and the like, and the viscosity may be adjusted by combining these conditions. As the aqueous medium, particularly polyethylene glycol may be used in that the particles can be easily adjusted to an appropriate particle size.

The weight ratio of the aqueous medium may be, for example, approximately from 10 to 100 parts by weight, preferably from 20 to 100 parts by weight, and still more preferably from 30 to 100 parts by weight per 100 parts by weight of the polyamide. The volume ratio of the aqueous medium may be not less than 50 volume % (for example, approximately from 50 to 90 volume %) with respect to the total volume of the aqueous medium and the polyamide. In a case where the ratio of the aqueous medium is too high, productivity may deteriorate. On the contrary, in a case where the ratio is too low, it may become difficult to produce polyamide particles with a small particle size.

The melt-kneading temperature only needs to be equal to or higher than the melting point or softening point of the polyamide, and it can be selected depending on the type of polyamide. For the alicyclic polyamide, the melt-kneading temperature is, for example, approximately not lower than 250° C. (for example, from 250 to 350° C.), preferably from 260 to 320° C., and still more preferably from 270 to 300° C.

The cooling method after the melt-kneading is not particularly limited, and from the viewpoint of productivity, forced cooling (rapid cooling) is preferred for the alicyclic polyamide. For example, the cooling rate may be not less than 1° C./min (for example, approximately from 1 to 10° C./min). As compared with the drying conditions (heating) after the solidification, an effect of the cooling method on crystallinity of the polyamide particles is smaller, but the alicyclic polyamide, which is slow in crystallization rate, may be forcibly cooled.

For the method of removing the aqueous medium from the cooled kneaded material, a method using a hydrophilic solvent is utilized, and the aqueous medium is usually removed by washing with the hydrophilic solvent. For the hydrophilic solvents, for example, water, alcohols (lower alcohols such as ethanol, and the like), water-soluble ketones (acetone and the like), and the like can be preferably utilized.

The step of adjusting moisture (the step of drying the solvent) is not particularly limited as long as the water absorption rate of the polyamide particles can be adjusted, and usually depending on the type of polyamide, temperature and humidity are adjusted and the aqueous medium used as a solvent is removed, as well as the water absorption rate of the polyamide particles is adjusted.

Specifically, water is usually used as the aqueous medium for the polyamide particles produced by the forced emulsification method, and therefore the polyamide particles often contains excess moisture. Thus, the water absorption rate may be adjusted by drying the polyamide particles in appropriate conditions (temperature, humidity, and time). For example, the temperature may be not higher than Tg, wherein the glass transition temperature of the polyamide is Tg, it may be preferably not higher than Tg−10° C., and it may be still more preferably not higher than Tg−30° C. (particularly not higher than Tg−50° C.) from the viewpoint of adjusting the water absorption rate of the particles as well as adjusting the particles to the degree of crystallinity. Specifically, from the viewpoint of adjusting the water absorption rate, for the alicyclic polyamide, the temperature may be, for example, approximately from 0 to 50° C., preferably 5 to 40° C., and still more preferably 10 to 30° C. In addition, for the aliphatic polyamide, the temperature may be, for example, approximately from 10 to 60° C., preferably from 20 to 55° C., and still more preferably from 30 to 50° C. The water absorption rate also depends on the relationship with the humidity, and in general, when the temperature becomes too high, the water absorption rate may decrease and the degree of crystallinity may become too high.

The humidity can be selected from a range approximately from 10 to 100% RH depending on the types of the polyamide and the target water absorption rate. Though the humidity may not be uniquely determined due to the dependency on the temperature and the drying time, the humidity may be approximately from 10 to 80% RH, preferably from 30 to 70% RH, and still more preferably from 40 to 60% RH for the alicyclic polyamide, for example. For the aliphatic polyamide such as polyamide 12, the humidity may be not lower than 50% RH, preferably approximately from 60 to 95% RH, and still more preferably from 70 to 90% RH. When the humidity is too low, the water absorption rate may decrease.

At such a temperature and humidity, time duration for adjusting the water absorption rate of the polyamide particles can be selected as appropriate depending on the temperature, the humidity, and the type of polyamide. For the alicyclic polyamide, the time duration may be, for example, approximately not less than 1 day, preferably not less than 3 days, and still more preferably not less than 5 days (for example, from 5 to 10 days). In addition, for the aliphatic polyamide, the time duration may be, for example, approximately not less than 5 hours, preferably not less than 10 hours, and still more preferably not less than 20 hours (for example, from 20 hours to 5 days).

[Curable Resin Composition]

The curable resin composition of the present invention includes a curable resin in addition to the polyamide particles. Furthermore, the curable resin may further include a curing agent and a curing accelerator. Moreover, the curable resin composition of the present invention may be a composition to produce a fiber-reinforced composite material (or a fiber-reinforced resin) including reinforcing fibers (a composition for a fiber-reinforced composite material or a composition for a fiber-reinforced resin).

(Curable Resin)

The curable resin may be either a thermosetting resin or a photo-curable resin. From the viewpoint of strength, thermal properties, and the like, a thermosetting resin is preferred in combination use with the polyamide. Therefore, the curable resin may include a thermosetting resin.

Examples of the thermosetting resin include epoxy resins, unsaturated polyester resins, vinyl ester resins, acrylic resins, phenol resins, urea resins, melamine resins, aniline resins, polyimide resins, and bismaleimide resins. These thermosetting resins may be used alone or in combination of two or more.

Among the thermosetting resins, particularly epoxy resins are preferred. Examples of the epoxy resins include glycidyl ether type epoxy resins, glycidyl amine type epoxy resins (for example, tetraglycidyl diaminodiphenylmethane, triglycidyl-p-aminophenol, triglycidyl aminocresol, diglycidyl aniline, N,N-diglycidyl-4-glycidyloxyaniline, and the like), glycidyl ester type epoxy resins such as diglycidyl esters of dicarboxylic acids (for example, aromatic dicarboxylic acids or hydrogenated compounds thereof, such as terephthalic acid, isophthalic acid, phthalic acid, tetrahydrophthalic acid, and hexahydrophthalic acid), alkene oxides (for example, vinylcyclohexene dioxide and the like), and triglycidyl isocyanurate.

Examples of the glycidyl ether type epoxy resins include epoxy resins having an aromatic skeleton (polyglycidyl ether) such as bisphenol type epoxy resins (reaction products of bisphenols or alkylene oxide adducts thereof and epichlorohydrin, such as bisphenol A type epoxy resins, bisphenol F type epoxy resins, bisphenol S type epoxy resins, and brominated bisphenol type epoxy resins), phenol type epoxy resins (phenol novolac type epoxy resins, cresol novolac type epoxy resins, naphthol novolac type epoxy resins, bisphenol A novolac type epoxy resins, bisphenol F novolac type epoxy resins, biphenyl skeleton-containing phenol novolac resins, xylylene skeleton-containing phenol novolac resins, and the like), dicyclopentadiene type epoxy resins, glycidyl ethers having a naphthalene skeleton including di(glycidyloxy)naphthalene such as 1,5-di(glycidyloxy) naphthalene, bis[2,7-di(glycidyloxy)naphthyl]methane, and the like; epoxy resins having an aliphatic skeleton (polyglycidyl ether) such as alkanediol diglycidyl ethers (for example, $C_{2-10}$ alkanediol diglycidyl ethers such as butanediol diglycidyl ether, neopentylglycol diglycidyl ether, and 1,6-hexanediol diglycidyl ether), polyalkanediol diglycidyl ethers (for example, poly $C_{2-4}$ alkanediol diglycidyl ethers such as polypropylene glycol diglycidyl ether), (di- to hexa-) glycidyl ethers of alkane(tri to hexa)ol (for example, (di- or tri-)glycidyl ethers of $C_{3-10}$ alkane(tri or tetra)ol such as trimethylolpropane (di- or tri-) glycidyl ether, glycerin (di- or tri-) glycidyl ether).

In the alkylene oxide adducts of the bisphenols, the addition mole number of the alkylene oxide to one mole of hydroxyl group of the bisphenols may be, for example, approximately not less than one mole (for example, 1 to 20 moles), preferably from 1 to 15 moles, and still more preferably from 1 to 10 moles.

These epoxy resins may be used alone or in combination of two or more. Among these epoxy resins, in view of strength and the like, epoxy resins having an aromatic skeleton such as, for example, bisphenol type epoxy resins are preferred. Therefore, the epoxy resin may be at least constituted of an epoxy resin having an aromatic skeleton, and an epoxy resin having an aromatic skeleton and another epoxy resin (for example, an epoxy resin having an aliphatic skeleton) may be combined.

The epoxy resin may be combined with a monofunctional epoxy compound (or a diluent) including a monoglycidyl ether (for example, an alkyl glycidyl ether such as 2-ethylhexyl glycidyl ether and the like, an alkenyl glycidyl ether such as an allyl glycidyl ether and the like, an aryl glycidyl ether such as a phenyl glycidyl ether, and the like), an alkene oxide (for example, octylene oxide, styrene oxide, and the like), and the like to constitute the epoxy resin. In a case where the epoxy resin and a monofunctional epoxy compound are combined, the ratio of the former/the latter (weight ratio) may be, for example, approximately from 99/1 to 50/50, preferably from 97/3 to 60/40, and still more preferably from 95/5 to 70/30.

The epoxy resin (or a composition of the epoxy resin and the monofunctional epoxy compound) may be in a solid state or in a liquid state at ordinary temperature (for example, approximately from 20 to 30° C.). The viscosity (25° C.) of the epoxy resin in a liquid state may be, for example, approximately from 50 to 50000 mPa·s, preferably 100 to 40000 mPa·s (for example, from 200 to 35000 mPa·s), still more preferably 300 to 30000 mPa·s (for example, from 500 to 25000 mPa·s), and it may be approximately not less than 1000 mPa·s (for example, from 2000 to 50000 mPa·s, preferably from 3000 to 30000 mPa·s, and still more preferably from 5000 to 25000 mPa·s).

(Curing Agent and Curing Accelerator)

The curing agent can be selected as appropriate depending on the type of curable resin, and examples of the curing agent in a case where the curable resin is the epoxy resin include, for example, amine-based curing agents, phenol resin-based curing agents (for example, phenol novolac resins, cresol novolac resins, and the like), acid anhydride-based curing agents (for example, aliphatic dicarboxylic anhydrides such as dodecenyl succinic anhydride and the like, alicyclic dicarboxylic anhydrides such as tetrahydrophthalic anhydride, methyltetrahydrophthalic anhydride, hexahydrophthalic anhydride and the like, aromatic dicarboxylic anhydrides such as phthalic anhydride, trimellitic anhydride, pyromellitic dianhydride, benzophenone tetracarboxylic anhydride, and the like), polymercaptan-based curing agents, latent curing agents (boron trifluoride-amine complex, dicyandiamide, carboxylic acid hydrazide, and the like), and the like.

Examples of the amine-based curing agents include: aromatic amine-based curing agents including, for example, polyaminoarenes (for example, diaminoarenes such as para-phenylenediamine and meta-phenylenediamine), polyamino-alkylarenes (for example, diamino-alkylarenes such as diethyltoluenediamine), poly(aminoalkyl)arenes (for example, di(aminoalkyl)arenes such as xylylenediamine), poly(aminoaryl)alkanes (for example, di(aminoaryl)alkanes such as diaminodiphenylmethane), poly(amino-alkylaryl) alkanes (for example, di(amino-alkylaryl)alkanes such as 4,4'-methylenebis(2-ethyl-6-methylaniline), bis(aminoaryl-alkyl)arenes (for example, 1,3-bis[2-(4-aminophenyl)-2-propyl)]benzene, 1,4-bis[2-(4-aminophenyl)-2-propyl)]benzene, and the like), di(aminoaryl) ether (for example, diaminodiphenyl ether and the like), di(aminoaryloxy) arenes (for example, 1,3-bis(3-aminophenoxy)benzene and the like), di(aminoaryl)sulfone (for example, diaminodiphenylsulfone and the like), and the like; aliphatic amine-based curing agents including, for example, ethylenediamine, hexamethylenediamine, diethylenetriamine, triethylenetetramine, tetraethylenepentamine, diethylaminopropylamine, and the like); alicyclic amine-based curing agents including, for example, menthenediamine, isophoronediamine, bis(4-amino-3-methylcyclohexyl)methane, 3,9-bis(3-aminopropyl)-2,4,8,10-tetraoxaspiro[5.5]undecane, norbornanediamine, and the like); imidazoles (for example, alkylimidazoles such as 2-methylimidazole, 2-phenylimidazole, 2-heptadecylimidazole, and 2-ethyl-4-methylimidazole; and arylimidazoles such as 2-phenylimidazole, 2-phenyl-4-methylimidazole, 2-phenyl-4-methyl-5-hydroxymethylimidazole, 1-benzyl-2-phenylimidazole) or salts thereof (for example, formate salts, phenol salts, phenol novolac salts, carbonate salts, and the like); and the like.

The curing agents may be used alone or in combination of two or more. The curing agents can also act as a curing accelerator.

Among them, particularly amine-based curing agents (for example, aromatic amine-based curing agents) may be suitably used.

The ratio of the curing agent can be selected as appropriate depending on the type of curable resin (epoxy equivalent and the like) or the type of curing agent, and it may be, for example, approximately from 0.1 to 300 parts by weight, preferably from 1 to 250 parts by weight, still more preferably from 3 to 200 parts by weight (for example, from 4 to 150 parts by weight), and particularly from 5 to 100 parts by weight per 100 parts by weight of the curable resin (particularly the epoxy resin).

The curing accelerator can also be selected as appropriate depending on the type of curable resin, and examples of the curing accelerator in a case where the curable resin is the epoxy resin include phosphines (for example, ethylphosphine, propylphosphine, trialkylphosphine, phenylphosphine, triphenylphosphine, and the like), amines (for example, secondary to tertiary amines such as triethylamine, piperidine, benzyldimethylamine, triethanolamine, dimethylaminoethanol, triethylenediamine, tris(dimethylaminomethyl)phenol, N,N-dimethylpyperazine; and salts thereof), and the like. The curing accelerators may be used alone or in combination of two or more.

The ratio of the curing accelerators can be selected as appropriate depending on the type of curing agent and the like, and it may be, for example, approximately from 0.01 to 100 parts by weight, preferably from 0.05 to 50 parts by weight, and still more preferably from 1 to 30 parts by weight per 100 parts by weight of the curable resin (particularly the epoxy resin).

In the composition of the present invention (or in a molded article described later), the ratio of the polyamide particles to the total amount of the polyamide particles and the curable resin (in a case where the curable resin includes the curing agent and/or the curing accelerator, the amount of the curable resin is the total amount of the curable resin, the curing agent and/or the curing accelerator) can be selected from a range of not greater than 50 wt. % (for example, approximately from 0.1 to 40 wt. %), and it may be, for example, approximately not greater than 30 wt. % (for example, from 0.5 to 25 wt. %), preferably not greater than 20 wt. % (for example, from 1 to 18 wt. %), still more preferably not greater than 15 wt. % (for example, from 2 to 12 wt. %), and it may be not greater than 10 wt. % (for example, from 0.5 to 8 wt. %, and preferably from 1 to 5 wt. %).

In addition, in the composition of the present invention (or in a molded article described later), the ratio of the polyamide particles to the total amount of the polyamide particles and the curable resin (in a case where the curable resin includes the curing agent and/or the curing accelerator, the amount of the curable resin is the total amount of the curable resin, the curing agent and/or the curing accelerator) can be selected from a range of not greater than 30 volume % (for example, approximately from 0.01 to 25 volume %), and it may be, for example, approximately not greater than 20 volume % (for example, from 0.1 to 15 volume %), preferably not greater than 10 volume % (for example, from 0.3 to 8 volume %), and still more preferably not greater than 5 volume % (for example, from 0.5 to 3 volume %).

(Reinforcing Fibers)

Reinforcing fibers (reinforcement fibers, fibrous reinforcing materials, fibrous fillers, fibrous fillers) are components to reinforce (or strengthen) the curable resin, and include inorganic fibers. Examples of the inorganic fibers include carbon fibers, glass fibers, boron fibers, aluminosilicate fibers, aluminum oxide fibers, silicon carbide fibers, metal fibers, potassium titanate fibers, and the like. These inorganic fibers can be used alone or in combination of two or more.

Among these inorganic fibers, carbon fibers and/or glass fibers are preferred, and carbon fibers are particularly preferred. Carbon fibers are not particularly limited, and they may be either pitch-based fibers, polyacrylonitrile (PAN)-based carbon fibers, or the like. These carbon fibers can be used alone or in combination of two or more.

The reinforcing fibers may include organic fibers in addition to the inorganic fibers. Examples of the organic fibers include polyester fibers including aromatic polyester fibers (for example, polyalkylene arylate fibers such as polyethylene terephthalate fibers) and the like, polyamide fibers including aromatic polyamide fibers (aramid fibers and the like) and the like, regenerated fibers (rayon and the like), and the like. These organic fibers can be used alone or in combination of two or more.

In a case where the inorganic fibers and the organic fibers are combined, the ratio of the inorganic fibers (particularly, carbon fibers and/or glass fibers) to the whole reinforcing fibers may be, for example, not less than 30 volume %, preferably not less than 50 volume %, still more preferably not less than 70 volume % (particularly not less than 90 volume %), and 100 volume % (particularly, only carbon fibers).

The reinforcing fibers may be surface-treated.

The average diameter of the reinforcing fibers varies with its type, and it can be selected from a range of approximately 0.5 to 1000 µm (for example, from 1 to 500 µm), and it may be, for example, approximately from 1 to 300 µm (for example, from 2 to 100 µm), preferably from 3 to 70 µm, and still more preferably from 5 to 50 µm (particularly from 5 to 30 µm).

In particular, the average diameter (average fiber diameter) of the carbon fibers may be, for example, approximately from 1 to 100 µm (for example, from 1.5 to 70 µm), preferably from 2 to 50 µm (for example, from 2.5 to 40 µm), still more preferably from 3 to 30 µm, particularly from 5 to 20 µm (for example, from 6 to 15 µm), and it may be usually approximately from 5 to 15 µm (for example, from 7 to 10 µm).

In the present specification and claims, the fiber diameter can be measured by a commonly used method. For example, it can be determined by measuring the fiber diameter of not less than 10 fibers using an electronic microscope and calculating the average value.

The reinforcing fibers may be either staple fibers or filaments, and, particularly, they may be filaments. The filaments may be either continuous fibers or discontinuous fibers, and continuous fibers and discontinuous fibers may be combined.

The reinforcing fibers may be in a form of a textile (or a cloth). Examples of the textile (fiber assembly) include woven fabrics (woven products), nonwoven fabrics, knitted fabrics (knitted products). In addition, the composition may include the reinforcing fibers together with the polyamide particles and the curable resin in a mode where the fibers are aligned (arranged) in the same direction (or one direction) as described later.

Structures of the cloth can be selected as appropriate depending on the type of cloth. Examples of the structures of the woven fabric (woven fabric structures) include plain weave, twill weave, satin weave, and the like, and not particularly limited. In addition, the structures of the knitted fabric (knitted fabric structures) include warp knitting (for example, tricot and the like), weft knitting (for example, plain knitting, moss stitch, and the like), and the like.

The present invention can sufficiently provide toughness of the curable resin and a reinforcing effect by the reinforcing fibers even in a case where the ratio of the polyamide particles is small.

In the composition (or the molded article described later) of the present invention, the ratio of the total amount of the polyamide particles and the curable resin may be, for example, approximately from 1 to 70 parts by weight, preferably from 2 to 50 parts by weight, and still more preferably from 3 to 30 parts by weight per 100 parts by weight of the reinforcing fibers.

(Other Components)

The composition of the present invention may further include other resin particles, thermoplastic resins, and commonly used additives as other components as necessary to the extent that they do not hinder the effects of the present invention.

Examples of the other resin particles include polyester particles (for example, aromatic polyester particles such as polyethylene terephthalate), polyacetal particles, polysulfide particles, polysulfone particles (including polyethersulfone particles), polyetherketone particles, polyolefin particles, and the like.

Examples of the thermoplastic resins include acrylic resins, polyolefin resins (for example, polypropylenes and the like), polyamide resins (polyamide resins exemplified above and the like), polyester resins (for example, aromatic polyester resins and the like such as polyethylene terephthalate), polycarbonate resins, polyphenylene ether resins, polyphenylene sulfide resins, polysulfone resins, polyetherketone resins, polyetheretherketone resins, polyimide resins, polyetherimide resins, and the like.

Examples of the commonly used additives include commonly used additives exemplified in the section of Polyamide particles and the like. The composition of the present invention may include electrically conductive particles, and usually it may not include electrically conductive particles.

The ratio of other components may be, for example, not greater than 10 parts by weight (for example, approximately from 0.01 to 10 parts by weight) per 100 parts by weight of the curable resin.

[Form and Production Process of Composition]

The form of the composition of the present invention is not particularly limited as long as the composition includes the polyamide particles and the curable resin, and the composition for fiber-reinforced composite materials further including reinforcing fibers (in addition, other components as necessary, the same applies hereinafter) may be usually in a form where the reinforcing fibers are impregnated (deposited) with a mixture including the polyamide particles and the curable resin (or a curable resin including the polyamide resin). Such a form can be described as a form where the reinforcing fibers and the polyamide particles are dispersed in the curable resin.

In addition, such a composition may be a prepreg (an intermediate material for molding). For example, in a case where the curable resin is a thermosetting resin component such as an epoxy resin component (a composition of an epoxy resin and a curing agent, and the like), the composition may be in a semi-cured state.

A specific form can be selected depending on the shape of the reinforcing fibers and the like, and examples thereof include (i) a form where a plurality of reinforcing fibers aligned in the same direction (or one direction) are impregnated with the mixture, (ii) a form where reinforcing fibers in a form of cloth are impregnated with the mixture, and the like. Among compositions in the form of (i), a prepreg is known as a UD prepreg and the like, and among compositions in the form of (ii), a prepreg is known as a cloth prepreg and the like.

The composition of the present invention can be produced by a method of mixing the polyamide particles and the curable resin. A composition for the fiber-reinforced composite material can be produced by mixing the reinforcing fibers, the polyamide particles, and the curable resin, and it can be usually produced by impregnating (or depositing) the reinforcing fibers with a mixture including the polyamide particles and the curable resin.

Examples of the specific impregnation methods include (a) impregnating the reinforcing fibers with the mixture in a liquid state, (b) bringing a material in a sheet form formed of the mixture into contact with the reinforcing fibers under an increased pressure, and the like.

In the method (a), the mixture in a liquid state may be produced using the curable resin in a liquid state (in a liquid state at an ordinary temperature) or may be produced using a proper solvent (a poor solvent for the polyamide particles). In addition, the mixture in a liquid state can also be produced by melting the curable resin.

[Molded Article]

The present invention also includes a molded article formed of a cured product of the curable resin composition. Among them, a molded article including reinforcing fibers can be described as a composite material (a fiber-reinforced composite material, particularly, a carbon fiber-reinforced composite material) because the article includes reinforcing fibers and the curable resin as a matrix resin to disperse the reinforcing fibers.

A process for producing the molded article (molding process) can be selected depending on a form of the composition, types of components, and the like. For example, the molded article (cured article) can be produced by curing the composition (in particular, the composition formed in a desired shape of the molded article). In addition, the molding method can be also selected depending on whether the thermosetting resin component is uncured, semi-cured, or the like. The shape of the molded article may be either a one-dimensional shape (a rod shape and the like), a two-dimensional shape (a sheet shape and the like), or a three-dimensional shape.

Examples of specific molding processes include a hand lay-up molding process, a sheet molding compound (SMC) press molding process, a resin infusion molding process (RIMP), a prepreg press molding process, a prepreg autoclave process, a winding process (a filament winding process, a pin winding molding process, and the like), a pultrusion molding process, a bulk molding compound (BMC) molding process, and the like.

In the way described above, the molded article can be produced. In such a molded article (or a composition) of the present invention, the polyamide particles can enhance the toughness of the cured product, and in the fiber-reinforced composite material, the polyamide particles can enhance the reinforcing effect by the reinforcing fibers (for example, interlaminar toughness and the like). In particular, in the present invention, the polyamide particles having a specific water absorption rate, shape, and particle size may enable the efficient reinforcement of the reinforcing fibers, and even in a case where the ratio of the polyamide particles is relatively small, a sufficient reinforcing function can be achieved.

EXAMPLES

The present invention will be described more in detail below based on examples, and the present invention is not limited by these examples. Abbreviations of materials used in examples and comparative examples are as follows, and resin particles and test pieces obtained in examples and comparative examples were evaluated for items below.
[Materials]
Alicyclic PA: Alicyclic polyamide, "TROGAMID CX7323" available from Daicel-Evonik Ltd., melting point of 247° C.
PA12 particles A: Polyamide 12 particles obtained by a chemical milling method (a method of dissolving a material in a solvent and then redepositing it to form powders), "VESTOSINT 2158" available from Daicel-Evonik Ltd.
PA12 particles B: Polyamide 12 particles produced by a chemical milling method, "VESTOSINT 2070" available from Daicel-Evonik Ltd.
Matrix resin: A mixture of an epoxy resin ("jER828" available from Mitsubishi Chemical Corporation) and an amine-based curing agent ("jER cure W" available from Mitsubishi Chemical Corporation)
Carbon fiber: "TC-33" available from HONLU TECHNOLOGY CO. LTD, average fiber diameter of about 7 μm.
[Average Particle Size]
Polyamide particles were dispersed in water and measured using a laser diffraction/scattering particle size distribution measuring apparatus ("LA920" available from HORIBA, Ltd.).
[BET Specific Surface Area]
A vacuum heating degassing was performed on the polyamide particles up to 80° C. using a pretreatment system for adsorption measurement ("Belprep vac-II" available from MicrotracBEL Corp.). The pretreated polyamide particles were measured for adsorption isotherm at a relative pressure set at adsorption $1.0 \times 10^{-3}$ to 0.35, by a nitrogen gas adsorption method under liquid nitrogen temperature (77 K) using a specific surface area/pore distribution measuring apparatus ("BELSORP-mini" available from MicrotracBEL Corp.). An actual relative pressure at the start of measurement depends on the degree of vacuum (resulting from the pretreatment of the polyamide particles) before measurement. The measurement was performed in a mode to actually measure dead volume. For analytical method, the BET method was used to determine the specific surface area.
[Water Absorption Rate]
Water absorption rate was measured in accordance with the Karl Fischer method using a trace moisture measurement apparatus ("CA-200" available from Mitsubishi Chemical Analytech Co., Ltd.) equipped with a moisture vaporizing device ("Model No. VA-200" available from Mitsubishi Chemical Analytech Co., Ltd.) under conditions of a measurement temperature of 210° C.
[Peak of Crystallization (DSC)]
The resulting polyamide particles were heated from room temperature to 300° C. at 10° C./min using a differential scanning calorimeter ("X-DSC7000" available from Seiko Instruments Inc.) to check whether an exothermic peak of crystallization can be observed while raising the temperature (between the glass transition temperature and the melting point).
[Degree of Crystallinity]
Using powder X-ray analytical software ("PDXL Ver. 2.3.1.0" available from Rigaku Corporation), a diffraction curve obtained by wide angle x-ray diffraction was fitted (method: FP method, peak shape: log-normal distribution, background refinement: none), thereby separating crystal diffraction peaks and amorphous halos to determine the degree of crystallinity (%) by the following equation.

Degree of crystallinity=[total sum of integrated intensities of crystal diffraction peaks (cps·deg)]/[total sum of integrated intensities of crystal diffraction peak and amorphous halos (cps·deg)]×100%.

[Interlaminar Fracture Toughness Test]
(Preparation of Test Pieces)
To a matrix resin, 5 wt. % of the polyamide particles produced in examples and comparative examples were added and stirred using a hot stirrer under conditions of 100° C. and 600 rpm for 24 hours. Thereafter, the mixture was allowed to stand in a vacuum vessel for one hour to defoam and produce a matrix resin including the polyamide particles.
(Test Piece A)
Using the resulting matrix resin, Test Piece A of 140 mm long×25 mm wide×2.8 mm thick was prepared without compounding reinforcing fibers. Specifically, curing conditions were: heating at 100° C. for 2 hours followed by heating at 175° C. for 4 hours. In addition, a precrack was formed at one longitudinal end part of Test Piece A. The precrack was formed by a procedure of inserting a polyimide film with a width of not less than 25 mm and a thickness of 25 μm ("KAPTON" available from DU PONT-TORAY CO., LTD.) into a precursor (an uncured product) of the sheet-shaped test piece from one longitudinal end toward the center in the thickness direction along the surface direction of the sheet in curing and then pulling out the polyimide film after curing.
(Test Piece B)
A fabric (plain weave) prepared by a hand lay up method using carbon fibers was impregnated with the resulting matrix resin (an uncured product), and then an operation of laminating the new fabric and then impregnating the laminated fabric with the matrix resin was repeated to produce a 12-layered laminate. Furthermore, the resulting laminate was placed in a thermostatic chamber while a pressure of about 8 MPa is being applied on the laminate, heated at 100° C. for two hours, and then heated at 175° C. for four hours to cure the laminate. To generate a precrack similarly to Test Piece A, a polyimide film of 25 μm thick was inserted when the 6th layer was laminated, and then the film was pulled out after curing. Thereafter, the resulting laminate was cut with a diamond cutter into the same shape as Test Piece A.

(Test Method)

The resulting Test Piece A was measured for plane strain fracture toughness ($K_{IC}$) in accordance with ASTM E399, and the resulting Test Piece B was measured for mode I interlaminar fracture toughness value ($G_{IR}$) during crack development and mode II interlaminar fracture toughness value ($G_{IIC}$) during early crack development in accordance with JIS K7086-1993.

Example 1

Using polyethylene glycol, the alicyclic PA was formed into microparticles by the forced emulsification method according to examples in JP 2010-132811 A. A melt-kneaded product extruded from a die of an extruder was subjected to forced cooling using a spot cooler and then washed with water to remove only polyethylene glycol. The product was filtered with a glass filter using an aspirator and then air-dried in an air-conditioned room controlled at a temperature of 23° C. and a humidity of 50% RH for one week to produce polyamide particles (powder). The resulting polyamide particles had an average particle size of 21 μm, a BET specific surface area of 0.36 m²/g, and a water absorption rate of 1.5 wt. %. In addition, an exothermal peak of crystallization was observed under conditions of raising temperature at 10° C./min by DSC. The degree of crystallinity was 11%.

Example 2

Polyamide particles were prepared by the same method as in Example 1 except that the time duration for air-drying in an air-conditioned room was shortened to three days. The resulting polyamide particles had an average particle size of 23 μm, a BET specific surface area of 0.33 m²/g, and a water absorption rate of 0.74 wt. %. In addition, the exothermal peak of crystallization was observed under conditions of raising temperature at 10° C./min by DSC. The degree of crystallinity was 11%.

Comparative Example 1

Using polyethylene glycol, the alicyclic PA was formed into microparticles by the forced emulsification method according to examples of JP 2010-132811 A. A melt-kneaded product extruded from a die of an extruder was not subjected to forced cooling but air-cooled and then washed with water to remove only polyethylene glycol. The product was dried by heating at 180° C. for four hours to produce polyamide particles. The resulting polyamide particles had an average particle size of 21 μm, a BET specific surface area of 0.36 m²/g, and a water absorption rate of 0.22 wt. %. In addition, the exothermal peak of crystallization was not observed under conditions of raising temperature at 10° C./min by DSC.

Comparative Example 2

The polyamide particles were prepared by the same method as in Comparative Example 1 except that the drying conditions were changed to those at 100° C. for eight hours. The resulting polyamide particles had an average particle size of 21 μm, a BET specific surface area of 0.36 m²/g, and a water absorption rate of 0.29 wt. %. In addition, the exothermal peak of crystallization was not observed under conditions of raising temperature at 10° C./min by DSC.

Comparative Example 3

The polyamide particles were prepared by the same method as in Comparative Example 1 except that the particles from which polyethylene glycol was removed were not dried. The resulting polyamide particles had an average particle size of 21 μm, a BET specific surface area of 0.36 m²/g, and a water absorption rate of 2.75 wt. %. In addition, the exothermal peak of crystallization was observed under conditions of raising temperature at 10° C./min by DSC.

Example 3

PA12 particles A were allowed to absorb moisture under a high humidity environment (temperature of 40° C. and humidity of 70% RH) for one day to produce polyamide particles. The resulting polyamide particles had an average particle size of 22 μm, a BET specific surface area of 2.67 m²/g, and a water absorption rate of 0.5 wt. %. In addition, the exothermal peak of crystallization was not observed under conditions of raising temperature at 10° C./min by DSC. The degree of crystallinity was 55%.

Comparative Example 4

PA12 particles A were used as they were as polyamide particles without any treatment. The resulting polyamide particles had an average particle size of 22 μm, a BET specific surface area of 2.67 m²/g, and a water absorption rate of 0.1 wt. %. In addition, the exothermal peak of crystallization was not observed under conditions of raising temperature at 10° C./min by DSC.

Example 4

PA12 particles B were allowed to absorb moisture under a high humidity environment (temperature of 40° C. and humidity of 70% RH) for one day to produce polyamide particles. The resulting polyamide particles had an average particle size of 8 μm, a BET specific surface area of 7.12 m²/g, and a water absorption rate of 0.5 wt. %. In addition, the exothermal peak of crystallization was not observed under conditions of raising temperature at 10° C./min by DSC.

Comparative Example 5

PA12 particles B were used as they were as polyamide particles without any treatment. The resulting polyamide particles had an average particle size of 8 μm, a BET specific surface area of 7.12 m²/g, and a water absorption rate of 0.1 wt. %. In addition, the exothermal peak of crystallization was not observed under conditions of raising temperature at 10° C./min by DSC.

The properties of the polyamide particles produced in examples and comparative examples are shown in Table 2. In addition, the results of the interlaminar fracture toughness test conducted on Test Pieces A and B prepared from the polyamide particles produced in examples and comparative examples are also shown in Table 2.

TABLE 2

| | Examples | | Comparative Examples | | | Example | Comparative Example | Example | Comparative Example |
|---|---|---|---|---|---|---|---|---|---|
| | 1 | 2 | 1 | 2 | 3 | 3 | 4 | 4 | 5 |
| Material | Alicyclic polyamide | | | | | | Polyamide 12 | | |
| Tg | about 135° C. | | | | | | about 50° C. | | |
| Water absorption rate (wt. %) | 1.5 | 0.74 | 0.22 | 0.29 | 2.75 | 0.5 | 0.1 | 0.5 | 0.1 |
| Degree of crystallinity (%) | 11 | 11 | — | — | — | 55 | — | — | — |
| Average particle size (μm) | 21 | 23 | 21 | 21 | 21 | 22 | 22 | 8 | 8 |
| BET (m²/g) | 0.36 | 0.33 | 0.36 | 0.36 | 0.36 | 2.67 | 2.67 | 7.12 | 7.12 |
| Presence of peak by DSC | Yes | Yes | No | No | Yes | No | No | No | No |
| $K_{IC}$ (kJ/m²) | 0.21 | 0.23 | 0.16 | 0.17 | 0.14 | 0.20 | 0.15 | 0.24 | 0.18 |
| $G_{IR}$ (kJ/m²) | 0.66 | 0.69 | 0.41 | 0.44 | 0.38 | 0.55 | 0.48 | 0.49 | 0.30 |
| $G_{IIC}$ (kJ/m²) | 5.8 | 6.1 | 4.7 | 4.9 | 4.4 | 5.6 | 4.5 | 5.3 | 4.3 |

As is clear from the results in Table 2, the polyamide particles have an appropriate water absorption rate, and thus the interlaminar toughness is also high in examples, while the resin particles have no crystallization peak and the interlaminar toughness is also low in comparative examples. In particular, the alicyclic polyamide particles of Examples 1 and 2 have an appropriate water absorption rate and a crystallization peak, and therefore the interlaminar toughness is particularly high.

INDUSTRIAL APPLICABILITY

The polyamide particles of the present invention can be utilized as a reinforcing agent for fiber-reinforced composite materials and/or curable resin compositions such as epoxy resin compositions. Examples of molded products formed of a cured product of the composition include structural members (structural materials) in various fields such as vehicles (for example, airplanes, helicopters, rockets, automobiles, motorbikes, bicycles, trains, ships and boats, wheelchairs, and the like), artificial satellites, windmills, sporting goods (golf shafts, tennis rackets), housings (housings for laptop personal computers and the like), molded articles in medical field (artificial bones and the like), IC trays, fishing rods, bridge piers, and the like.

The invention claimed is:

1. Polyamide particles comprising:
a polyamide having a water absorption rating of 0.5 to 2.5 wt. %; and
water in an amount of 0.5 to 2.5 wt %, wherein the polyamide particles have a specific surface area determined by the BET method of from 0.33 to 12 m²/g, wherein degree of crystallinity of the polyamide measured by differential scanning calorimetry (DSC) is 1 to 30%.

2. The polyamide particles according to claim 1, wherein the polyamide is a semicrystalline polyamide.

3. The polyamide particles according to claim 1, wherein a glass transition temperature of the polyamide is from 100 to 150° C.

4. The polyamide particles according to claim 1, wherein the polyamide is an alicyclic polyamide and/or an aliphatic polyamide.

5. The polyamide particles according to claim 1, which have an average particle size of from 5 to 40 μm.

6. The polyamide particles according to claim 1, wherein the polyamide particles have the specific surface area determined by the BET method of from 0.33 to 7·12 m²/g.

7. The polyamide particles according to claim 1, which are spherical and have an average particle size of 15 to 25 μm.

8. The polyamide particles according to claim 1, which have an exothermic peak in a temperature range between the glass transition temperature and a melting point of the polyamide upon heating the polyamide particles at a rate of 10° C./min by differential scanning calorimetry (DSC).

9. The polyamide particles according to claim 1, wherein degree of crystallinity of the polyamide measured by differential scanning calorimetry (DSC) is 80 or less.

10. The polyamide particles according to claim 1, wherein degree of crystallinity of the polyamide measured by differential scanning calorimetry (DSC) is 1 to 75%.

* * * * *